(No Model.)
S. SHEPARDSON.
CAR COUPLING.
No. 492,242. Patented Feb. 21, 1893.
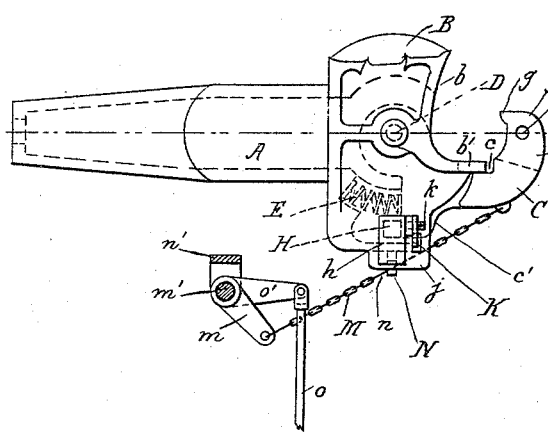
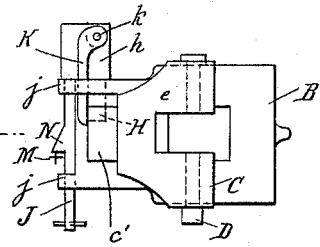
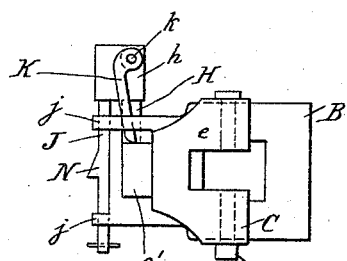
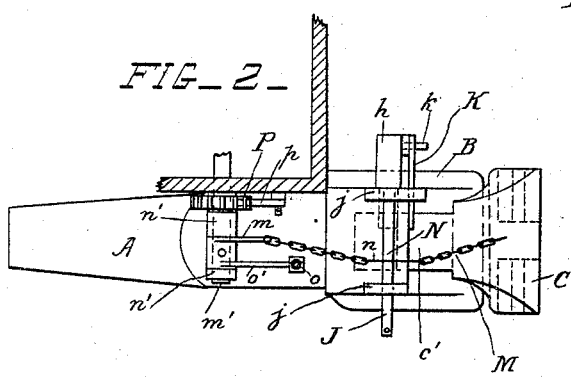
WITNESSES
C. D. Kesler.
J. F. Coleman
INVENTOR
Samuel Shepardson
by Herbert W. T. Jenner.
Attorney

UNITED STATES PATENT OFFICE.

SAMUEL SHEPARDSON, OF LA GRANGE, IOWA.

CAR-COUPLING.

SPECIFICATION forming part of Letters Patent No. 492,242, dated February 21, 1893.

Application filed December 27, 1892. Serial No. 456,340. (No model.)

*To all whom it may concern:*

Be it known that I, SAMUEL SHEPARDSON, a citizen of the United States, residing at La Grange, in the county of La Grange and State of Iowa, have invented certain new and useful Improvements in Car-Couplings; and I do hereby declare the following to be a full, clear, and exact description of the invention, such as will enable others skilled in the art to which it appertains to make and use the same.

This invention relates to car couplings of the kind shown and described in the Patent No. 487,297, issued to me on December 6, 1892; and it consists in the novel construction and combination of the parts hereinafter fully described and claimed.

In the drawings: Figure 1 is a plan view, from above, of one half of the coupling. Fig. 2 is a side view of the same. Fig. 3 is a front view of the same. Fig. 4 is a front view similar to Fig. 3 but shows the locking pin raised.

The coupling may be made of two similar halves adapted to engage automatically as described in the patent above noted, or one half of the coupling may be connected to a dissimilar half coupling by means of an ordinary connecting link.

A is the drawhead adapted to be attached to the end of the car in the usual manner. The drawhead is provided with the socket B and a hook C pivoted therein on the pin D arranged on the center line drawn through the socket longitudinally. The front edge $b$ of the socket is curved on one side, and is provided with the projecting lug $b'$ on the other side. The hook C is provided with a recess $c$ which engages with the lug $b'$. A spring E is arranged within the socket B and is adapted to press against the back of the projection $c'$ on the hook and to hold the hook in the position shown in Fig. 1. The front end $e$ of the hook is forked, and is provided with a vertical pin hole $e'$ arranged on the center line of the coupling and adapted to receive the pin for connecting the hook to the link of an ordinary coupling. The front end $e$ of the hook is rounded at $f$, so that when two similar half couplings are pushed together, each hook is pushed backward on its pivot against the pressure of its spring E until the hook nearly meets the curved portion $b$. The springs B then force the hooks into engagement with each other. The front end $e$ of each hook is provided with a slight projection $g$, which engages with a similar recess in the other hook. As the pivot pin of each hook, and the point of contact of the hooks with the curved edges $b$, are substantially on the center line of the halves of the coupling, the strain of pushing or pulling is always on the said center line, and there is no tendency to separate the hooks when the cars are drawn along.

H is a locking-pin provided with a head $h$. The locking-pin H slides vertically in a hole in the socket B close behind the projection $c'$.

J is a vertical guide secured to the head $h$ of the locking-pin and adapted to slide in the lugs $j$ projecting from the socket B.

K is a catch pivoted on the pin $k$ projecting from the head $h$. The pin $k$ is arranged to one side of the center of gravity of the catch K, so that, when the locking-pin is raised clear of the projection $c'$, the catch rests on the top of the said projection and sustains the locking-pin. When the hook is pressed back, as in the act of pressing together the two halves of the coupling, the projection $c'$ is moved from under the catch K which falls a short distance, and the locking-pin H rests on the top of the said projection $c'$. When the hook is forced forward by the pressure of the spring E, the locking-pin falls by gravity behind the projection $c'$ and prevents the halves of the coupling from becoming disengaged, by preventing the hook from turning backward on its pivot.

M is the uncoupling chain secured at one end to the hook C, and at the other end to the arm $m$ secured on the spindle $m'$. The chain M is provided with a long link $n$ which passes under the projection N on the guide J. The hook is drawn back by turning the arm $m$. This action first tightens the chain, which normally hangs in a curve under the projection N, and thus raises the locking-pin. The continued movement of the arm $m$ draws back the hook and disengages the halves of the coupling. The spindle $m'$ is journaled in a bracket $n'$ secured to the frame of the car.

P is a ratchet wheel secured on the spindle $m'$, and $p$ is a pivoted pawl which engages with the ratchet wheel and is adapted to hold back the coupling hook against the pressure of its spring, when desired for any purpose.

The spindle $m'$ may be operated by a hand wheel secured at the top of the car and not shown in the drawings, or it may be operated by a rod $o$ and an arm $o'$ pivoted to the rod and secured on the said spindle.

What I claim is—

1. In a car coupling, the combination, with the drawhead socket, and the spring-pressed hook pivoted horizontally therein and provided with the projection $c'$, of the locking-pin sliding vertically in the socket behind the said projection and provided with a head and a guide, and the automatic catch pivoted to the head of the locking-pin, whereby the said pin is supported when the said catch rests on the projection $c'$, substantially as set forth.

2. In a car coupling, the combination, with the pin for locking the coupling hook, said pin being provided with a guide and an automatic supporting-catch normally resting on a projection on the coupling hook, of a chain passing under a projection on the said guide and secured to the coupling hook, and means for pulling the chain, whereby the chain is straightened and caused to lift the locking-pin before pulling back the coupling hook, substantially as set forth.

3. In a car coupling, the combination, with the drawhead socket, and the spring-pressed coupling hook provided with the projection $c'$, of the locking-pin provided with a guide and a projection N on the guide, an automatic catch pivoted to the head of the locking-pin and adapted to rest on the projection $c'$, a pivoted arm and means for operating it, and a chain pivoted to the said arm, passing under the projection N and attached to the coupling hook, whereby the locking-pin is raised from behind the projection $c'$ and the coupling hook is drawn back, substantially as set forth.

In testimony whereof I affix my signature in presence of two witnesses.

SAMUEL SHEPARDSON.

Witnesses:
HERBERT W. T. JENNER,
EMMA M. GILLETT.